(12) United States Patent
Lee et al.

(10) Patent No.: US 9,480,096 B1
(45) Date of Patent: Oct. 25, 2016

(54) METHOD, DEVICE, AND SYSTEM FOR FAST WIRELESS ACCESSORY DEVICES PAIRING

(71) Applicant: MOTOROLA SOLUTIONS, INC., Schaumburg, IL (US)

(72) Inventors: Kok Bee Lee, Penang (MY); Kong Chin Chee, Penang (MY); Sze Keat Ng, Kedah (MY); Rm Muthaiah Ramanathan, Bayan Lepas (MY); Syed Isa Syed Idrus, Bayan Lepas (MY); Ting Fook Tang, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/834,540

(22) Filed: Aug. 25, 2015

(51) Int. Cl.
*H04B 7/00* (2006.01)
*H04W 76/02* (2009.01)
*H04W 4/00* (2009.01)

(52) U.S. Cl.
CPC ........... *H04W 76/023* (2013.01); *H04W 4/005* (2013.01); *H04W 4/008* (2013.01); *H04W 76/021* (2013.01)

(58) Field of Classification Search
None
See application file for complete search history.

(56) References Cited

U.S. PATENT DOCUMENTS

| 2013/0182576 | A1 | 7/2013 | Linsky | |
|---|---|---|---|---|
| 2013/0316649 | A1* | 11/2013 | Newham | H04W 88/04 455/41.2 |
| 2015/0286813 | A1* | 10/2015 | Jakobsson | G06F 21/35 726/9 |

FOREIGN PATENT DOCUMENTS

| WO | 2013180860 A1 | 12/2013 |
|---|---|---|
| WO | 2013181778 A1 | 12/2013 |

* cited by examiner

*Primary Examiner* — Mohammed Rachedine
(74) *Attorney, Agent, or Firm* — Daniel R. Bestor (57) ABSTRACT

An improved fast wireless accessory device pairing process at a radio communication device includes initiating, via a first short-range transceiver, a pairing procedure with a wearable computing device and establishing a link with the wearable computing device. Subsequently, receiving Bluetooth device connection information for each of a plurality of wireless accessory devices associated with a wearer of the wearable computing device. The Bluetooth device connection information includes at least a hardware device identifier of the associated wireless accessory and capability information of the associated wireless accessory. Responsive to receiving the Bluetooth device connection information, and for each of the plurality wireless accessory devices, using the hardware device identifier and capability information to pair with and communicate with the wireless accessory device.

15 Claims, 3 Drawing Sheets

METHOD, DEVICE, AND SYSTEM FOR FAST WIRELESS ACCESSORY DEVICES PAIRING

BACKGROUND OF THE INVENTION

In some communication scenarios, it is desirable to have wireless device pairing, for instance pairing of a mobile radio with multiple wireless accessory devices when the mobile radio and the peripherals implement a wireless protocol, such as Bluetooth, which requires the utilization of a propagating, i.e., electromagnetic, radio signal to send data. One example scenario where such wireless device pairing is desired is in the area of Public Safety. More particularly, Public Safety officers may select mobile radios that implement the Bluetooth protocol from a pool of mobile radios in a multi-unit charger and pair their own wireless accessory devices with the selected mobile radio; and this accessory pairing procedure may occur every time an officer picks up a mobile radio from a pool of available mobile radios maintained at a station house or other location.

Known pairing technologies have shortcomings in providing quick and easy pairing between a mobile radio and multiple wireless accessory devices. For example, Bluetooth protocols require a discovery phase in which the mobile radio locates other available wireless accessory devices for pairing, a selection phase in which the mobile radio user chooses one of the located wireless accessory devices to pair with, and a pairing phase that may involve a user typing a series of symbols (e.g., a PIN, for example decimal digits for Bluetooth and hexadecimal or ASCII characters for IEEE's 802.11b's Wireless Equivalent Privacy (WEP) protocol) to validate that the user is pairing the correct accessory, all of which must be completed before data and/or voice communications may occur between the mobile radio and the wireless accessory accessories. Further, as officers collect more and more wireless accessory devices in and around their person, such as biomedical sensors, video cameras, remote speaker microphones (RSMs), smart glasses, ear buds, etc., the amount of time and number of steps needed to be completed every time the officer obtains a new mobile radio becomes burdensome.

Thus, there exists a need for an improved method and system for wireless device pairing that more quickly and efficiently pairs a new mobile radio with a plurality of wireless accessory devices associated with an officer.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and system for wireless accessory device pairing that more quickly and efficiently pairs a new mobile radio with a plurality of wireless accessory devices associated with an officer.

In one embodiment a method for fast wireless accessory device pairing comprises, at a radio communication device: initiating, via a first short-range transceiver, a pairing procedure with a wearable computing device and establishing, via the first short-range transceiver a link with the wearable computing device; receiving, via the link with the wearable computing device, Bluetooth device connection information for each of a plurality of wireless accessory devices associated with a wearer of the wearable computing device, the Bluetooth device connection information including at least a hardware device identifier of the associated wireless accessory and capability information of the associated wireless accessory; and responsive to receiving the Bluetooth device connection information, and for each of the plurality wireless accessory devices, using the hardware device identifier and capability information to pair with and communicate with, via a second short-range transceiver, the wireless accessory device.

In a further embodiment, a radio communication device for fast wireless accessory device pairing comprises: one or more short-range transceivers; one of a speaker and display; a data store; and one or more processors configured to: initiate, via a first of the one or more short-range transceivers, a pairing procedure with a wearable computing device and establishing, via the first short-range transceiver a link with the wearable computing device; receive, via the link with the wearable computing device, Bluetooth device connection information for each of a plurality of wireless accessory devices associated with a wearer of the wearable computing device, the Bluetooth device connection information including at least a hardware device identifier of the associated wireless accessory and capability information of the associated wireless accessory; and responsive to receiving the Bluetooth device connection information, and for each of the plurality wireless accessory devices, use the hardware device identifier and capability information to pair with and communicate with, via a second of the one or more short-range transceivers, the wireless accessory device.

In a still further embodiment, a communication system comprises: a radio communication device comprising: one or more short-range transceivers; one of a speaker and display; a data store; and one or more processors configured to: initiate, via a first of the one or more short-range transceivers, a pairing procedure with a wearable computing device and establishing, via the first short-range transceiver a link with the wearable computing device; receive, via the link with the wearable computing device, Bluetooth device connection information for each of a plurality of wireless accessory devices associated with a wearer of the wearable computing device, the Bluetooth device connection information including at least a hardware device identifier of the associated wireless accessory and capability information of the associated wireless accessory; and responsive to receiving the Bluetooth device connection information, and for each of the plurality wireless accessory devices, use the hardware device identifier and capability information to pair with and communicate with, via a second of the one or more short-range transceivers, the wireless accessory device; and a wearable computing device comprising: one or more short-range transceivers; a data store; and one or more processors configured to: for each of a plurality of wireless accessory devices associated with the wearable computing device, receive the Bluetooth device connection information including at least a hardware device identifier of the associated wireless accessory and capability information of the associated wireless accessory and store the Bluetooth device connection information in the data store; pair with and establish a communication link with, via the one or more short-range transceivers, the radio communication device; and transmit the Bluetooth device connection information to the radio communication device via the established communication link.

Each of the above-mentioned embodiments will be discussed in more detail below, starting with example network and device architectures of the system in which the embodiments may be practiced, followed by an illustration of processing steps and message transmissions and/or receptions for achieving fast channel deployment at an incident scene from a subscriber device and from an incident center computing device perspective. Further advantages and features consistent with this disclosure will be set forth in the following detailed description, with reference to the figures.

1. SYSTEM ARCHITECTURE AND DEVICE STRUCTURES

Figure 1:
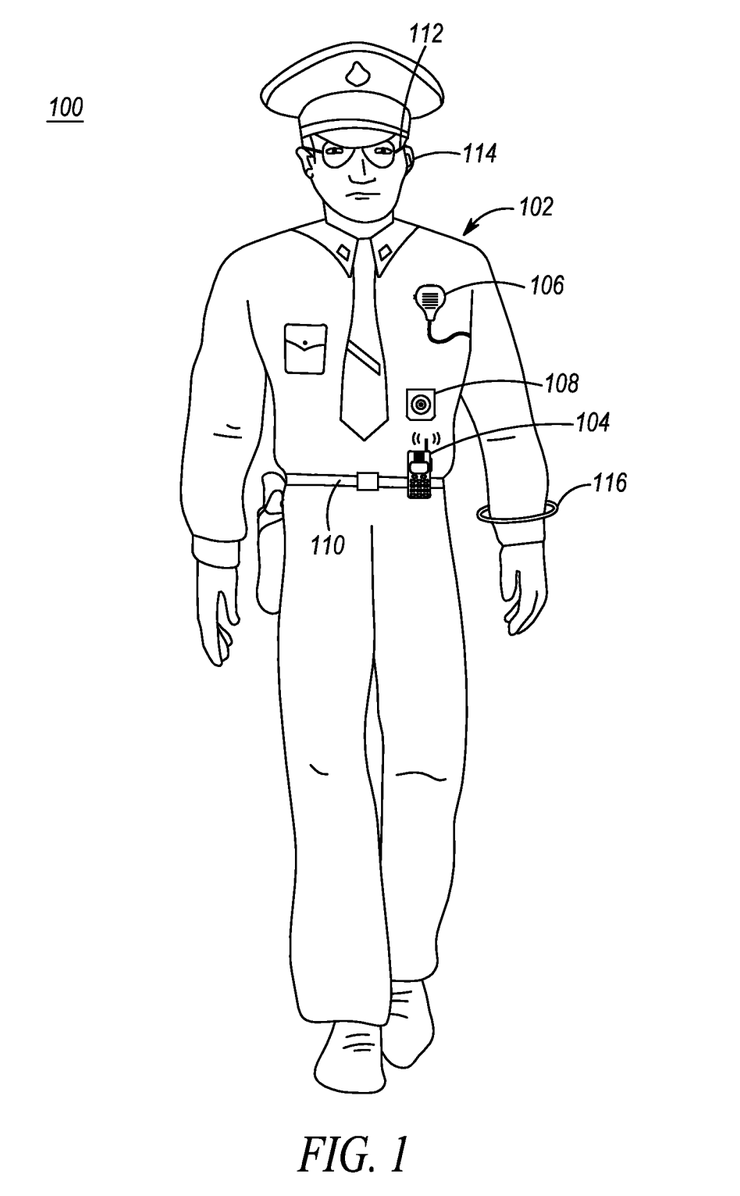
FIG. 1 is a system diagram illustrating an officer wearing a mobile radio, a plurality of wireless accessory devices, and a wearable computing device that implement improved wireless accessory devices pairing in accordance with some embodiments.

Referring now to the drawings, and in particular FIG. 1, a system diagram illustrates a system 100 of wireless devices that an officer 102 or other person may wear, including a primary mobile radio 104 used for narrowband or broadband communications, a remote speaker microphone (RSM) 106, a video camera 108, a biometric sensor device 110, a pair of smart glasses 112, an earpiece 114, and a wearable computing device 116 for storing Bluetooth device connection information.

The mobile radio 104 may be any wireless device used for infrastructure-supported or direct mode media (e.g., voice, audio, video, etc.) communication via a long-range transmitter (e.g., in comparison to a short-range transmitter such as a Bluetooth, Zigbee, or NFC transmitter) and/or transceiver with other mobile radios in a same or different group of mobile radios as the mobile radio 104. The long-range transmitter may have a transmit range on the order of miles, e.g., 0.5-50 miles, or 3-20 miles.

Infrastructure-supported wireless communications may be made via radio access networks (RANs) that provide for radio communication links to be arranged within the network between a plurality of mobile radios. Such mobile radios may also be known as 'mobile stations' or 'subscriber devices.' At least one other terminal, e.g. used in conjunction with mobile radios, may be a fixed terminal, e.g. a base station, eNodeB, repeater, and/or access point. Such a RAN typically includes a system infrastructure which generally includes a network of various fixed terminals that are in direct radio communication with the mobile radios. Each of the fixed terminals operating in the RAN may have one or more transceivers that may, for example, serve mobile radios in a given region or area, known as a 'cell' or 'site', by radio frequency (RF) communication. The mobile radios that are in direct communication with a particular fixed terminal are said to be served by the fixed terminal. In one example, all radio communications to and from each radio within the RAN are made via respective serving fixed terminals. Sites of neighboring fixed terminals may be offset from one another and may be non-overlapping or partially or fully overlapping with one another.

RANs may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. RANs may additionally or alternatively operate according to an industry standard broadband protocol such as, for example, the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard, among many other possibilities. Because the LMR systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocol. Mobile radios in RANs such as those set forth above send and receive media streams (encoded portions of voice, audio, and/or audio/video streams) in a call in accordance with the designated protocol.

OMA-PoC, in particular, enables familiar PTT and "instant on" features of traditional half duplex subscriber devices, but uses mobile subscriber devices operating over modern broadband telecommunications networks. Using PoC, wireless subscriber devices such as mobile telephones and notebook computers can function as PTT half-duplex subscriber devices for transmitting and receiving. Other types of PTT models and multimedia call models (MMCMs) are also available.

Floor control in an OMA-PoC session is generally maintained by a PTT server that controls communications between two or more wireless subscriber devices. When a user of one of the mobile radios keys a PTT button, a request for permission to speak in the OMA-PoC session is transmitted from the user's radio to the PTT server using, for example, a real-time transport protocol (RTP) message. If no other users are currently speaking in the PoC session, an acceptance message is transmitted back to the user's radio and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other subscriber devices in the group of mobile radios or talk group to which the user is subscribed), using for example a unicast, point to multipoint, or broadcast communication technique.

Narrowband LMR systems, on the other hand, may operate in either a conventional or trunked configuration. In either configuration, a plurality of mobile radios are partitioned into separate groups of subscriber devices. In a conventional system, each radio in a group is selected to a particular frequency for communications associated with that radio's group. Thus, each group is served by one channel, and multiple groups may share the same single frequency (in which case, in some embodiments, group IDs may be present in the group data to distinguish between groups using the same shared frequency).

In contrast, a trunked radio system and its mobile radios use a pool of traffic channels for virtually an unlimited number of groups of subscriber devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile radios in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Individual (e.g., one to one) or group (e.g., one to many) calls may be made between wireless and/or wireline participants in accordance with the narrowband or broadband protocol or standard. Group members for group calls may be statically or dynamically defined. That is, in a first example, a user or administrator working on behalf of the user may indicate to the switching and/or radio network (perhaps at a controller device, such as a call controller, PTT server, serving gateway, radio network controller (RNC), zone controller, or mobile management entity (MME), base station controller (BSC), mobile switching center (MSC), site controller, Push-to-Talk controller, or other network device) a list of participants of a group at the time of the call or in advance of the call. The group members (e.g., mobile radios) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile radios may dynamically affiliate with a group (and also disassociate with the group) perhaps based on user input, and the switching and/or radio network may track group membership and route new group calls according to the current group membership.

Direct mode, on the other hand, is a mode of operation where mobile radios may communicate within a network without the assistance of one or more infrastructure equipment (e.g., base stations, access points, eNodeBs, or repeaters). Direct mode can provide a more efficient and less costly communication system operation than repeater mode operation. The ETSI-DMR standard provides for 12.5 Kilohertz (KHz) operation in direct mode. In the 12.5 direct mode of operation, mobile radios transmit asynchronously and mobile radios within range of the transmission synchronize themselves to that transmission for the purposes of receiving the transmission. Other direct mode protocols, perhaps consistent with the Project 25 (P25) standard defined by the Association of Public Safety Communications Officials International (APCO) and standardized under the Telecommunications Industry Association (TIA), or with the terrestrial trunked radio (TETRA) standard also defined by the ETSI, may operate in a similar manner and may be used in addition to or in place of the DMR protocol. Communications in accordance with any one or more of these direct mode communication standards, or other standards, may take place over physical channels in accordance with a TDMA (time division multiple access) protocol, perhaps in combination with an FDMA (frequency divisional multiple access) or CDMA (code division multiple access) protocol.

In the example of FIG. 1, the mobile radio 104 forms the hub of communication connectivity for the officer, through which other wireless accessory devices may communicate. In order to communicate with such other wireless accessory devices, the mobile radio 104 also contains a short-range transmitter (e.g., in comparison to the long-range transmitter such as a LMR or Broadband transmitter) and/or transceiver. As set forth above, the short-range transmitter may be a Bluetooth, Zigbee, or NFC transmitter having a transmit range on the order of 0.01-100 meters, or 0.1-10 meters.

Wireless accessory devices 106-112 communicate with the mobile radio 104 via their own short-range transmitter and/or transceivers, and provide specialized function extensions to the mobile radio 104. For example, the RSM 106 may act as a remote microphone that the officer 102 may access more easily and is better positioned near the officer's 102 mouth. Audio and/or voice received at the RSM 106 may be provided to the mobile radio 104 for further transmission via its long-range transmitter to other users. A speaker may also be provided in the RSM 106 unit such that audio and/or voice received at the mobile radio 104 is transmitted to the RSM 106 and repeated closer to the officer's 102 ear.

The video camera 108 may be an always-on device or an activated-on-demand video capture device that provides video and/or audio to the mobile radio 104 for storage at the mobile radio 104 or for further transmission to a dispatch center or to other mobile radio users via the mobile radio's 104 long-range-transmitter.

The biometric sensor device 110 may be a device capable of sensing biometric data of its wearer, such as heart rate, body temperature, etc. Additionally or alternatively, an environmental sensor may be provided to detect environmental parameters such as oxygen levels, temperature, radiation, etc. The biometric sensor device 110 provides measured parameter information to the mobile radio 104 for storage and/or analysis at the mobile radio 104 and/or for further transmission to a dispatch center or to other users via the radio's long-range-transmitter.

The smart glasses 112 may maintain a bi-directional connection with the mobile radio 104 and provide an always-on or on-demand video feed pointed in a direction of the officer's gaze, and/or may provide a personal display via a projection mechanism integrated into the smart glasses 112 for displaying information such as text, images, or video received from the mobile radio 104. In some embodiments, an additional user interface mechanism such as a touch interface may be provided on the smart glasses 112 that allows the officer 102 to interact with the display elements displayed on the smart glasses 112.

The earpiece 114 may maintain an audio connection with the mobile radio 104 and provide the officer 102 the ability to discretely hear private or group communications received at the mobile radio 104 from other mobile radios or from an infrastructure device, and which may be provided to the earpiece 114 for private reproduction to the officer 102.

The wearable computing device 116 is an electronic device with storage for storing Bluetooth device connection information of each of a plurality of the wearable accessory devices 106-114 associated with a wearer of the wearable computing device 116, allowing the mobile radio 104 to more quickly and efficiently pair with the plurality of wireless accessory devices associated with the officer 102. Although the wearable computing device 116 is shown in FIG. 1 as a bracelet worn around the wrist, in other examples, the wearable computing device 116 may be worn around another part of the body, or may take a different physical form including an earring, a finger ring, a necklace, or some other type of wearable form factor. The wearable computing device 116 contains a short-range wireless interface for communicating with the mobile radio 104 and a same or different short-range wireless interface for communicating with each of the wireless accessory devices 106-114.

Figure 2:
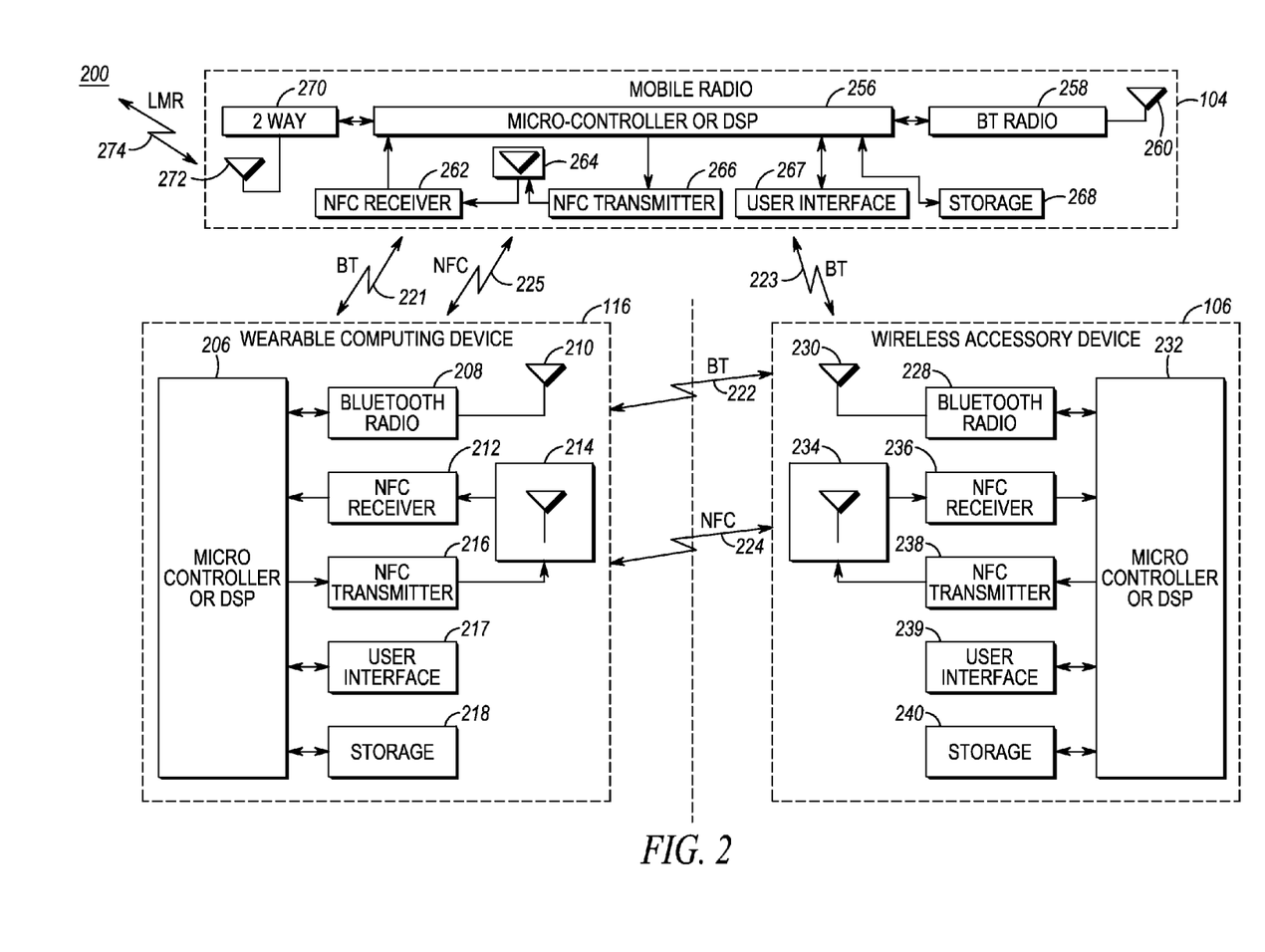
FIG. 2 is a pictorial diagram showing device structures and wireless interfaces between the mobile radio, plurality of wireless accessory devices, and the wearable computing device of FIG. 1 in accordance with some embodiments.

FIG. 2 provides a more detailed block diagram of each of the major components of the system 100, including the mobile radio 104, the wireless accessory device 106, and the wearable computing device 116. While only one wireless accessory device 106 is illustrated in FIG. 2 for ease of illustration, wireless accessory devices 108-114 may include same or similar structures as set forth in FIG. 2 and function in same or similar ways to the description set forth herein for wireless accessory device 106 for the purposes of quickly and efficiently pairing the mobile radio 104 with the plurality of wireless accessory devices 108-114 associated with the wearer of the wearable computing device 116.

Figure 3:
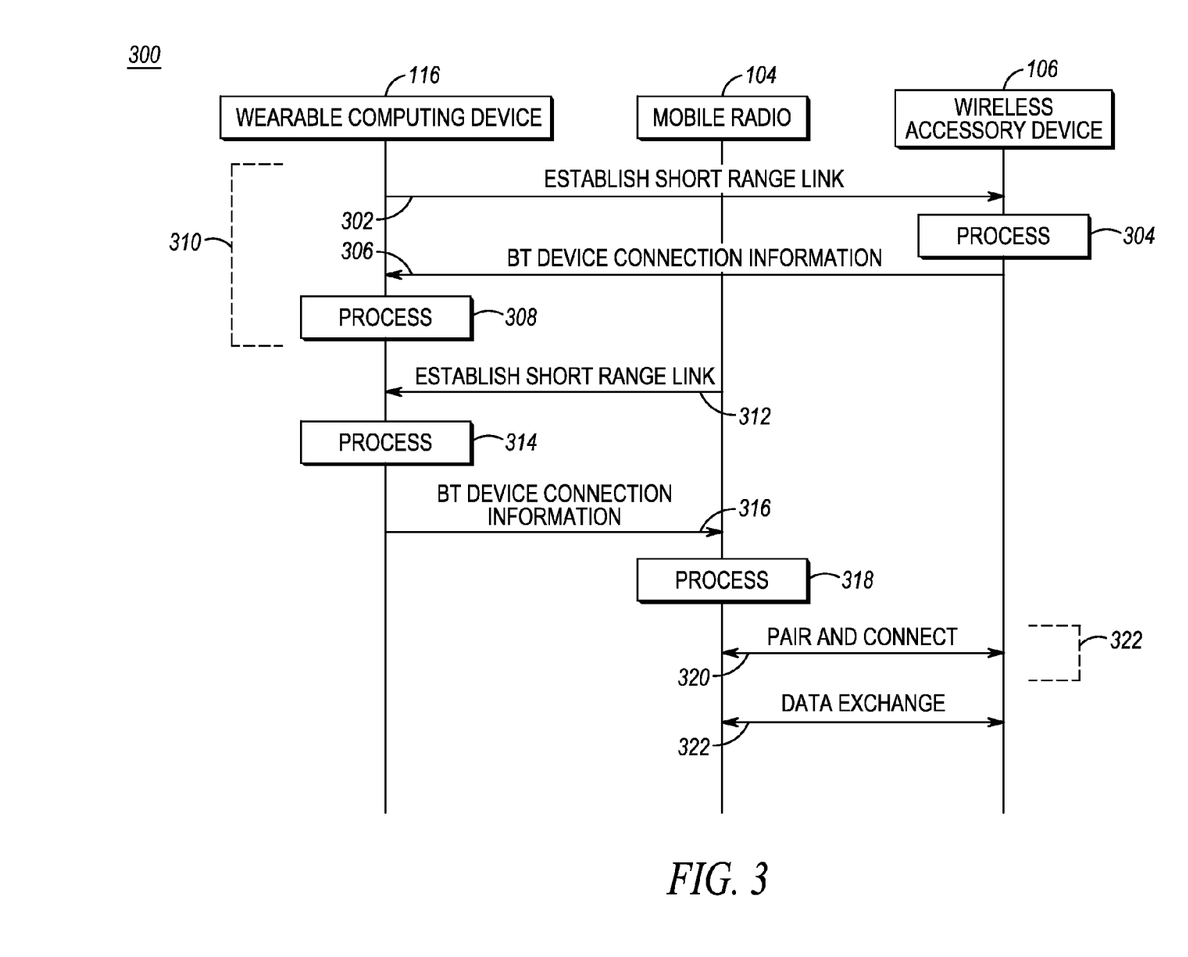
FIG. 3 illustrates a message sequence chart (MSC) showing transmissions, receptions, and process steps for improved wireless accessory devices pairing in accordance with some embodiments.

Wearable computing device 116 comprises: a microcontroller or digital signal processor (DSP) 206; a Bluetooth radio 208 with a corresponding Bluetooth antenna 210 for communicating with other devices via Bluetooth links 221, 222, an optional NFC receiver 212/transmitter 216 and corresponding NFC antenna 214 for communicating with other devices via NFC links 224, 225, and a computer readable storage 218 that may store computer readable instructions that, when executed by the microcontroller 206, perform one or more of the transmitting, receiving, and/or processing steps set forth in FIG. 3 and/or may store Bluetooth device connection information for each of the plurality of wireless accessory devices 106-114 and/or for the mobile radio 104, the Bluetooth device connection information including at least a hardware device identifier and capability information. The capability information may be, for example, a Bluetooth profile identifier. Finally, the wearable computing device 116 may also include a user interface 217, which may include a display and/or LEDs, a touch input interface, a mechanical input interface, and/or one or more buttons or switches, among other possibilities.

Wireless accessory device 106 comprises: a microcontroller or DSP 232; a Bluetooth radio 228 with a corresponding Bluetooth antenna 230 for communicating with other devices via Bluetooth links 222, 223, an optional NFC receiver 236/transmitter 238 and corresponding NFC antenna 214 for communicating with other devices via NFC link 224, and a computer readable storage 240 that may store computer readable instructions that, when executed by the microcontroller 232, perform one or more of the transmitting, receiving, and/or processing steps set forth in FIG. 3 and/or may store Bluetooth device connection information for the wearable computing device 116 and/or the mobile radio 104, the Bluetooth device connection information including at least a hardware device identifier and capability information. The capability information may be, for example, a Bluetooth profile identifier. Finally, the wireless accessory device 106 may also include a user interface 239, which may include a display and/or LEDs, a touch input interface, a mechanical input interface, and/or one or more buttons or switches, among other possibilities.

Mobile radio 104 comprises: a microcontroller or DSP 256; a Bluetooth radio 258 with a corresponding Bluetooth antenna 260 for communicating with other devices via Bluetooth links 221, 223, an optional NFC receiver 262/transmitter 266 and corresponding NFC antenna 264 for communicating with other devices via NFC link 225, a two-way narrowband (NB) or broadband (BB) radio 270 and corresponding antenna 272, and a computer readable storage 268 that may store computer readable instructions that, when executed by the microcontroller 256, perform one or more of the transmitting, receiving, and/or processing steps set forth in FIG. 3 and/or may store Bluetooth device connection information for the wearable computing device 116 and/or the wireless accessory device 106, the Bluetooth device connection information including at least a hardware device identifier and capability information. The capability information may be, for example, a Bluetooth profile identifier.

The two-way NB or BB radio 270 may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. The two-way NB or BB radio 270 may additionally or alternatively operate according to an industry standard broadband protocol such as, for example, the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard, among many other possibilities.

The mobile radio 104 may also include a user interface 267, which may include a display and/or LEDs, a touch input interface, a mechanical input interface, and/or one or more buttons or switches, among other possibilities.

2. PROCESSES FOR FAST WIRELESS ACCESSORY DEVICES PAIRING

Turning now to FIG. 3, a message sequence chart illustrates a method 300 for fast wireless accessory devices pairing in accordance with some embodiments. Method 300 is illustrated as occurring between the wearable computing device 116, mobile radio 104, and wireless accessory device 106. While only one wireless accessory device 106 is illustrated in FIG. 3 for ease of illustration purposes, same or similar steps may be executed in parallel or sequentially for additional wireless accessory devices 108-114 in the manner described below.

Method 300 begins by a user, such as officer 102, wearing or otherwise handling a wearable computing device 116 and bringing one or more wireless accessory devices such as wireless accessory device 106 to within proximity of the wearable computing device 116 such that the devices come within a short-range transmission range of each other. For example, the wireless accessory device 106 may be brought within a range of 0.01-1 meters of the wearable computing device such that the wearable computing device 116 may establish the short range link 308 with the wireless accessory device 106 via an NFC link 224. In another example, the wireless accessory device 106 may be brought within a range of 0.1-10 meters of the wearable computing device such that the wearable computing device 116 may establish the short range link 308 with the wireless accessory device 106 via a Bluetooth link 222. The establishment of the short range link 308 may be initiated by either the wearable computing device 116 or the wireless accessory device 106, perhaps as a result of a periodic beacon transmitted by one device and detected by the other, as a result of a user-actuation of a user-interface element on one or both of the devices that initiates a discovery process between the two devices, or via some other process.

At step 304, the wireless accessory device 106 retrieves Bluetooth device connection information and provides it back to the wearable computing device 116 via the Bluetooth device connection information transmission 306. The Bluetooth device connection information may be retrieved from storage 240 and may comprise one or both of a hardware device identifier of the associated wireless accessory device and capability information of the associated wireless accessory. In the event that the wireless accessory device 106 is using the same Bluetooth radio 228 to provide the Bluetooth device connection information that it will use with the mobile radio 104, the Bluetooth device connection information may only include the capability information as the hardware device identifier may already have been made available to the wearable computing device when establishing the short-range connection 302. In another embodiment where the Bluetooth device connection information 306 is not provided over the same Bluetooth radio 228, for example is instead provided over the NFC link 224, the Bluetooth device connection information 306 may also include the hardware device identifier of the Bluetooth radio 228 used to interface with the mobile radio 104.

At step 304, the wireless accessory device 106 may be configured to automatically provide the Bluetooth device connection information 306 to wearable computing device 116 upon establishment of the short range link 302, may be configured to only provide the Bluetooth device connection information 306 to wearable computing device 116 upon request (the request automatically sent by the wearable computing device 116 upon establishment of the short range link 302 or sent by the wearable computing device 116 in response to activation of a user-interface of the wearable computing device 116 associated with requesting Bluetooth device connection information from the wireless accessory device 106) for such information transmitted by the wearable computing device over the established short range link (not shown), or may be configured to only provide the Bluetooth device connection information 306 to wearable computing device 116 upon user-actuation of a user-interface at the wireless accessory device 106 associated with providing such Bluetooth device connection information to wearable computing device 116, among other possibilities.

The hardware device identifier may be, for example, a Bluetooth media access control (MAC) address of the Bluetooth radio 228 (also known as a Bluetooth Address). The capability information may vary based on the function of the wireless accessory device 106 and may be, for example, one or more Bluetooth profile identifiers. Bluetooth profile identifiers may include an advanced audio distribution profile (A2DP) profile, a file transfer profile (FTP) profile, a hands-free profile (HFP) profile, a health device profile (HDP) profile, a headset profile (HSP) profile, a human interface device profile (HID) profile, a message access profile (MAP) profile, a phone book access profile (PBAP) profile, a personal area networking profile (PAN) profile, a synchronization profile (SYNC) profile, and a video distribution profile (VDP) profile. In the example of FIG. 1 where the wireless accessory device 106 is a video camera, the capability information may include the VDP profile, among other possibilities. The profile information sets forth how to communicate with and/or operate the wireless accessory device 106 over a Bluetooth link 222, 223, and is information that is commonly exchanged upon a first pairing of two Bluetooth devices.

At step 308, the wearable computing device 116 processes and stores the received Bluetooth device connection information. In the event the Bluetooth device connection information 306 included both the hardware identifier and the capability information, the wearable computing device 116 stores the information together in, for example, storage 218. In the event that the Bluetooth device connection information 306 included only the capability information, the wearable computing device 116 may assume that the Bluetooth radio 228 it established the short range link 302 with is the same radio that the wireless accessory device 106 will use with the mobile radio 104, and in response also extracts the Bluetooth hardware identifier of the Bluetooth radio 228 identified during the establishment of the short range link 302 and stores the hardware identifier together with the received capability information.

As shown via dashed lines 310 in FIG. 3, the steps 302-308 set forth in FIG. 3 with respect to wireless accessory device 106 are repeated for each of the other wireless accessory devices associated with the wearer of the wearable computing device 116 (e.g., wireless accessory devices 108-114 in the example set forth in FIG. 1) and the wearable computing device 116 stores all five sets of Bluetooth device connection information in its storage 218.

Subsequently, the wearer of the wearable computing device 116 brings a mobile radio 104, e.g., perhaps a mobile radio 104 chosen from a pool of generally available mobile radios, into proximity of the wearable computing device 116. For example, the officer 102 of FIG. 1 may pick up a mobile radio 104 from a pool of mobile radios available at a precinct or other location, with the intent of using the mobile radio 104 for his or her shift. Because the mobile radio 104 was most likely used by another officer prior to the officer's 102 use of the mobile radio 104, or otherwise has not yet been used by the officer 102 (and thus has not yet paired or does not maintain any Bluetooth connection information for any of the wireless accessory devices 106-114), it is not paired with any of the officer's 102 wireless accessory devices 106-114 at the time the officer 102 picks up the mobile radio 104.

After bringing the mobile radio 104 to within proximity of the wearable computing device 116 such that the devices come within a short-range transmission range of each other, a short range link 312 is established between the mobile radio 104 and the wearable computing device 116. For example, mobile radio 104 may be brought within a range of 0.01-1 meters of the wearable computing device 116 such that the wearable computing device 116 may establish the short range link 312 with the mobile radio 104 via an NFC link 225. In another example, the mobile radio 104 may be brought within a range of 0.1-10 meters of the wearable computing device 116 such that the wearable computing device 116 may establish the short range link 312 with the mobile radio 104 via a Bluetooth link 221. The establishment of the short range link 312 may be initiated by either the mobile radio 104 or the wearable computing device 116, perhaps as a result of a periodic beacon transmitted by one device and detected by the other, as a result of a user-actuation of a user-interface element on one or both of the devices that initiates a discovery process between the two devices, or via some other process.

At step 314, the wearable computing device 116 retrieves all Bluetooth device connection information for all wireless accessory devices it knows of (e.g., established via steps 310 with each of wireless accessory devices 106-114 and stored in storage 218) and provides each set of Bluetooth device connection information to the mobile radio 104 via the Bluetooth device connection information transmission 316. Whether or not the Bluetooth device connection information transmission 316 is provided via the Bluetooth link 221 or the NFC link 225, the Bluetooth device connection information includes each set of hardware identifier and capability information associated with each of the wireless accessory devices 106-114.

At step 314, the wearable computing device 116 may be configured to automatically provide the Bluetooth device connection information 316 to mobile radio 104 upon establishment of the short range link 316, may be configured to only provide the Bluetooth device connection information 316 to mobile radio 104 upon request (the request automatically sent by the mobile radio 104 upon establishment of the short range link 316 or sent by the mobile radio 104 in response to activation of a user-interface of the mobile radio 104 associated with requesting Bluetooth device connection information from the wearable computing device 116) for such information transmitted by the mobile radio 104 over the established short range link (not shown), or may be configured to only provide the Bluetooth device connection information 306 to mobile radio 104 upon user-actuation of a user-interface at the wearable computing device 116 associated with providing such Bluetooth device connection information to mobile radio 104, among other possibilities.

At step 318, the mobile radio 104 processes and stores the received Bluetooth device connection information in, for example, storage 268. As a result, the mobile radio 104 obtains Bluetooth device connection information for each of a plurality of Bluetooth wireless accessory devices associated with a user of the mobile radio 104 and a wearer of the plurality of Bluetooth wireless accessory devices without previously connecting with the wireless accessory devices, without having to execute a Bluetooth discovery phase to discover the existence of the plurality of Bluetooth wireless accessory devices, without having to prompt its user to sequentially select each of the plurality of Bluetooth wireless accessory devices to connect to, and without having to operate any user interface elements on one or more of the plurality of wireless accessory devices to enter a discovery mode.

The mobile radio 104 may then use the Bluetooth device connection information received and stored at step 320 to pair and connect 320 with the wireless accessory device 106. More specifically, the mobile radio 104 uses the Bluetooth hardware device identifier and capability information of the wireless accessory device 106 to pair and connect 320 with the device. The first time the mobile radio 104 pairs with the wireless accessory device 106 after receiving its Bluetooth device connection information the mobile radio 104 may prompt its user with a security PIN or code, which it may then store in storage 268 so that subsequent attempts to pair and connect with the wireless accessory device do not have to prompt the user (e.g., subsequent attempts until the mobile radio 104 is returned to the pool of radios for use by another officer).

As indicated via dashed bracket 322 in FIG. 3, step 320 is repeated for each of the plurality of wireless accessory device Bluetooth device connection information received at step 318. In the example set forth in FIG. 1 in which five wireless accessory devices 106-114 are present, step 320 is repeated a total five times for each of the wireless accessory devices 106-114 associated with each of the five Bluetooth device connection information sets received at step 318. While five wireless accessory devices 106-114 are illustrated in this example, more or less than five wireless accessory devices could be used.

Subsequently, the mobile radio may begin using the wireless accessory device 106 and transferring data and control signaling 322 in accordance with the capability information for the wireless accessory device 106. Similar functions may be performed for each of the other wireless accessory devices 108-114. Information exchanged via Bluetooth wireless accessory device 106 and other wireless accessory devices 108-114 may then be exchanged via the mobile radio's 104 two-way radio 270 with other mobile radios or an infrastructure network via radio link 274.

3. CONCLUSION

In accordance with the foregoing, an improved method and system for wireless accessory device pairing that more quickly and efficiently pairs a mobile radio with a plurality of wireless accessory devices associated with an officer. As a result of the foregoing, an Officer or other individual having a plurality of wireless accessory devices can more quickly and efficiently pair with and connect to the plurality of wireless accessory devices without having to sequentially and manually connect each wireless accessory device and without having to spend time interfacing with the mobile radio and each of the wireless accessory devices to connect them. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for fast wireless accessory device pairing, the method comprising, at a mobile radio communication device having a first long-range transceiver capable of operating in accordance with one of a land mobile radio (LMR) and broadband protocol:

initiating, at the mobile radio communication device via a first near field communication (NFC) short-range transceiver, a pairing procedure with a wearable computing device and establishing, via the first short-range transceiver, a link with the wearable computing device;

receiving, at the mobile radio communication device via the NFC link with the wearable computing device, Bluetooth device connection information for each of a plurality of wireless accessory devices associated with a wearer of the wearable computing device, the Bluetooth device connection information including at least a Bluetooth hardware device identifier of the associated wireless accessory and Bluetooth capability information of the associated wireless accessory; and responsive to receiving the Bluetooth device connection information, and for each of the plurality wireless accessory devices, using, by the mobile radio communication device, the Bluetooth hardware device identifier and Bluetooth capability information to pair with and communicate with, via a second Bluetooth short-range transceiver different from the NFC short-range transceiver, the wireless accessory device wherein the mobile radio communication device pairs with and communicates with, via the second Bluetooth short-range transceiver, each of the wireless accessory devices using the Bluetooth device connection information and without (i) executing a discovery process that scans for available wireless accessory devices via the second Bluetooth short-range transceiver and (ii) prompting a wearer of the wearable computing device to connect to each wireless accessory device via the second Bluetooth short-range transceiver.

2. The method of claim 1, wherein the mobile radio communication device pairs with and communicates with, via the second Bluetooth short-range transceiver, each of the wireless accessory devices without executing a discovery process that scans for available wireless accessory devices via the second Bluetooth short-range transceiver.

3. The method of claim 1, wherein the mobile radio communication device pairs with and communicates with, via the second Bluetooth short-range transceiver, each of the wireless accessory devices without prompting a wearer of the wearable computing device to connect to each wireless accessory device via the second Bluetooth short-range transceiver.

4. The method of claim 1, wherein the hardware device identifier is a Bluetooth media access control (MAC) address of the associated wireless accessory.

5. The method of claim 1, wherein the capability information of the associated wireless accessory is a Bluetooth profile identifier.

6. The method of claim 5, wherein the Bluetooth profile identifier is one of a advanced audio distribution profile (A2DP), a file transfer profile (FTP), a hands-free profile (HFP), a health device profile (HDP), a headset profile (HSP), a human interface device profile (HID), a message access profile (MAP), a phone book access profile (PBAP), a personal area networking profile (PAN), a synchronization profile (SYNC), and a video distribution profile (VDP).

7. The method of claim 1, wherein the wearable computing device is one of a wearable ring and a wearable bracelet.

8. The method of claim 1, wherein the plurality of wireless accessory devices comprise two or more selected from a wireless earpiece device, a wireless environmental sensor, a wireless biometric strap, a wireless remote speaker microphone (RSM), a video camera, and a picture camera.

9. The method of claim 1, further comprising, at the mobile radio communication device, and while using the hardware device identifier and capability information to pair with and communicate with, via the second Bluetooth short-range transceiver, a particular one of the plurality of wireless accessory devices, prompting a wearer of the wearable computing device for an alphanumeric security code, detecting an input security code, using the input security code to pair with and communicate with the particular wireless accessory device, and storing the security code along with an association with the received Bluetooth hardware device identifier and Bluetooth capability information for the particular wireless accessory device for future re-connection with the particular wireless accessory device.

10. The method of claim 1, wherein the pairing procedure with the wearable computing device is initiated by the mobile radio communication device in response to a detected activation of an input at the mobile radio communication device requesting retrieval of Bluetooth device connection information for each of the plurality of wireless accessory devices from the wearable computing device.

11. The method of claim 10, wherein the pairing procedure with the wearable computing device includes the mobile radio communication device prompting a wearer of the wearable computing device for an alphanumeric security code, detecting, by the mobile radio communication device, an input security code, and using the input security code in a first pairing with the wearable computing device.

12. A mobile radio communication device for fast wireless accessory device pairing, the device comprising:
a near field communication (NFC) short-range transceivers;
a Bluetooth short-range transceiver different from the NFC short-range transceiver;
a long-range transceiver capable of operating in accordance with one of a land mobile radio (LMR) and broadband protocol;
one of a speaker and display;
a data store; and
one or more processors configured to:
initiate, via the NFC short-range transceivers, a pairing procedure with a wearable computing device and establishing, via the NFC short-range transceiver, a link with the wearable computing device;
receive, via the link with the wearable computing device, Bluetooth device connection information for each of a plurality of wireless accessory devices associated with a wearer of the wearable computing device, the Bluetooth device connection information including at least a Bluetooth hardware device identifier of the associated wireless accessory and Bluetooth capability information of the associated wireless accessory; and
responsive to receiving the Bluetooth device connection information, and for each of the plurality wireless accessory devices, use the Bluetooth hardware device identifier and Bluetooth capability information to pair with and communicate with, via the Bluetooth short-range transceivers, the wireless accessory device, wherein the mobile radio communication device pairs with and communicates with, via the second Bluetooth short-range transceiver, each of the wireless accessory devices using the Bluetooth device connection information and without (i) executing a discovery process that scans for available wireless accessory devices via the second Bluetooth short-range transceiver and (ii) prompting a wearer of the wearable computing device to connect to each wireless accessory device via the second Bluetooth short-range transceiver.

13. The mobile radio communication device of claim 12, wherein the mobile radio communication device pairs with and communicates with, via the Bluetooth short-range transceiver, each of the wireless accessory devices without executing a discovery process that scans for available wireless accessory devices via the Bluetooth short-range transceiver.

14. The mobile radio communication device of claim 12, wherein the mobile radio communication device pairs with and communicates with, via the Bluetooth short-range transceiver, each of the wireless accessory devices without prompting a wearer of the wearable computing device to connect to each wireless accessory device via the Bluetooth short-range transceiver.

15. A communication system comprising:
a mobile radio communication device comprising:
a near field communication (NFC) short-range transceiver;
a Bluetooth short-range transceiver different from the NFC short-range transceiver;
a long-range transceiver capable of operating in accordance with one of a land mobile radio (LMR) and broadband protocol;
one of a speaker and display;
a data store; and
one or more processors configured to:
initiate, via the NFC short-range transceivers, a pairing procedure with a wearable computing device and establishing, via the first NFC short-range transceiver, a link with the wearable computing device;
receive, via the link with the wearable computing device, Bluetooth device connection information for each of a plurality of wireless accessory devices associated with a wearer of the wearable computing device, the Bluetooth device connection information including at least a Bluetooth hardware device identifier of the associated wireless accessory and Bluetooth capability information of the associated wireless accessory; and
responsive to receiving the Bluetooth device connection information, and for each of the plurality wireless accessory devices, use the Bluetooth hardware device identifier and Bluetooth capability information to pair with and communicate with, via the Bluetooth short-range transceivers, the wireless accessory device; and wherein the mobile radio communication device pairs with and communicates with, via the second Bluetooth short-range transceiver, each of the wireless accessory devices using the Bluetooth device connection information and without (i) executing a discovery process that scans for available wireless accessory devices via the second Bluetooth short-range transceiver and (ii) prompting a wearer of the wearable computing device to connect to each wireless accessory device via the second Bluetooth short-range transceiver; and a wearable computing device comprising:

a near field communication (NFC) short-range transceivers;

a data store; and one or more processors configured to:

for each of the plurality of wireless accessory devices associated with the wearable computing device, receive the Bluetooth device connection information including at least the Bluetooth hardware device identifier of the associated wireless accessory and Bluetooth capability information of the associated wireless accessory and store the Bluetooth device connection information in the data store;

pair with and establish the link with, via the NFC short-range transceivers, the mobile radio communication device; and transmit the Bluetooth device connection information to the mobile radio communication device via the link.

\* \* \* \* \*

UNITED STATES PATENT AND TRADEMARK OFFICE
CERTIFICATE OF CORRECTION

PATENT NO. : 9,480,096 B1  Page 1 of 1
APPLICATION NO. : 14/834540
DATED : October 25, 2016
INVENTOR(S) : Kok Bee Lee et al.

It is certified that error appears in the above-identified patent and that said Letters Patent is hereby corrected as shown below:

In the Claims

In Column 14, Line 38, in Claim 1, delete "plurality wireless" and insert -- plurality of wireless --, therefor.

In Column 15, Lines 52-53, in Claim 12, delete "transceivers;" and insert -- transceiver; --, therefor.

In Column 16, Line 8, in Claim 12, delete "plurality wireless" and insert -- plurality of wireless --, therefor.

In Column 16, Line 12, in Claim 12, delete "transceivers," and insert -- transceiver, --, therefor.

In Column 16, Line 50, in Claim 15, delete "transceivers;" and insert -- transceiver, --, therefor.

In Column 16, Line 52, in Claim 15, delete "first NFC" and insert -- NFC --, therefor.

In Column 16, Line 63, in Claim 15, delete "plurality wireless" and insert -- plurality of wireless --, therefor.

In Column 16, Line 67, in Claim 15, delete "transceivers," and insert -- transceiver, --, therefor.

In Column 16, Line 67, in Claim 15, delete "device; and" and insert -- device; --, therefor.

In Column 17, Lines 12-13, in Claim 15, delete "transceivers;" and insert -- transceiver; --, therefor.

In Column 17, Line 25, in Claim 15, delete "transceivers," and insert -- transceiver, --, therefor.

Signed and Sealed this
Eighth Day of May, 2018

Andrei Iancu
*Director of the United States Patent and Trademark Office*